US010034057B2

(12) United States Patent
Liu et al.

(10) Patent No.: US 10,034,057 B2
(45) Date of Patent: Jul. 24, 2018

(54) MESSAGE PROCESSING METHOD, DEVICE, GATEWAY, STB AND IPTV (71) Applicant: ZTE Corporation, Shenzhen (CN)

(72) Inventors: Yang Liu, Shenzhen (CN); Na Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/911,161

(22) PCT Filed: Mar. 3, 2014

(86) PCT No.: PCT/CN2014/072814
§ 371 (c)(1),
(2) Date: Feb. 9, 2016

(87) PCT Pub. No.: WO2014/135050
PCT Pub. Date: Sep. 12, 2014

(65) Prior Publication Data
US 2016/0198235 A1 Jul. 7, 2016

(30) Foreign Application Priority Data
Aug. 9, 2013 (CN) .......................... 2013 1 0348150

(51) Int. Cl.
H04N 21/61 (2011.01)
H04N 21/422 (2011.01)
H04N 21/436 (2011.01)
H04N 21/4227 (2011.01)
H04N 21/254 (2011.01)
H04N 21/4627 (2011.01)
(Continued)

(52) U.S. Cl.
CPC ..... *H04N 21/6125* (2013.01); *H04N 21/2541* (2013.01); *H04N 21/4227* (2013.01);
(Continued)

(58) Field of Classification Search
CPC ....... H04N 21/42219; H04N 21/43615; H04N 21/4227; H04N 21/64322; H04N 21/4627;
(Continued)

(56) References Cited

U.S. PATENT DOCUMENTS

2003/0088633 A1* 5/2003 Chiu ....................... H04L 29/06
709/206
2006/0164550 A1* 7/2006 Yoshimoto .......... H04L 12/2812
348/571
(Continued)

FOREIGN PATENT DOCUMENTS

CN 101521797 A 9/2009
CN 101854513 A 10/2010
(Continued)

OTHER PUBLICATIONS

International Search Report for corresponding application PCT/CN2014/072814 filed on Mar. 3, 2014; dated May 6, 2014.
(Continued)

*Primary Examiner* — Chenea Smith
(74) *Attorney, Agent, or Firm* — Cantor Colburn LLP (57) ABSTRACT Provided are a message processing method, a device, a gateway, a Set-Top Box (STB) and an Internet Protocol Television (IPTV) system. The gateway is connected with a network where the STB is located and connected with a network where a terminal is located, can communicate with the STB and the terminal, and is configured to forward a message between the STB and the terminal. The disclosure solves the problem of being unable to interact with an STB if the matched remote control is lost or damaged, and achieves interaction with the STB through a terminal, thus providing a different mode of interaction with the STB, and improving user experience.

8 Claims, 4 Drawing Sheets (51) Int. Cl.
*H04N 21/63* (2011.01)
*H04N 21/643* (2011.01)

(52) U.S. Cl.
CPC . *H04N 21/42219* (2013.01); *H04N 21/43615* (2013.01); *H04N 21/4627* (2013.01); *H04N 21/631* (2013.01); *H04N 21/64322* (2013.01)

(58) Field of Classification Search
CPC ............ H04N 21/6125; H04N 21/631; H04N 21/2541
See application file for complete search history.

(56) References Cited

U.S. PATENT DOCUMENTS

2008/0238709 A1* 10/2008 Vaziri .................. H04N 5/4403
340/4.32
2013/0332979 A1* 12/2013 Baskaran .......... H04N 21/42207
725/132
2014/0223465 A1* 8/2014 Hatambeiki ..... H04N 21/44204
725/14
2015/0212657 A1* 7/2015 Schilit ................. G06F 3/04847
715/810

FOREIGN PATENT DOCUMENTS

| EP | 2302914 A1 | 3/2011 |
| EP | 2386975 A2 | 11/2011 |
| EP | 2439892 A1 | 4/2012 |

OTHER PUBLICATIONS

European Search Report for corresponding application EP 14 75 9842; Report dated Apr. 26, 2016.

* cited by examiner

MESSAGE PROCESSING METHOD, DEVICE, GATEWAY, STB AND IPTV

TECHNICAL FIELD

The disclosure relates to the field of communications, and in particular to a message processing method, a device, a gateway, a Set-Top Box (STB) and an Internet Protocol Television (IPTV) system.

BACKGROUND

With the deepening of Triple play, IPTV system is widely applied; at present, generally an STB is provided at the user side to receive a video stream or other service contents in the IPTV system.

In related art, users generally control an STB via a remote control that interacts with the STB; the remote control and the STB, which generally carry out communications in an infrared manner, are matched to use. If the remote control is lost at one moment or damaged, the STB cannot be controlled unless the button on the STB is pressed or until the remote control is repaired.

In related art, there is no solution for the problem of being unable to interact with an STB if the matched remote control is lost or damaged.

SUMMARY

The embodiment of the disclosure provides a message processing method, a device, a gateway, an STB and an IPTV system, to solve the problem of being unable to interact with an STB if the matched remote control is lost or damaged.

According to one aspect of the embodiment of the disclosure, a gateway is provided, which is connected with a network where an STB is located and connected with a network where a terminal is located, and can communicate with the STB and the terminal, and is configured to forward a message between the STB and the terminal.

Preferably, the message includes: an operation message sent by the terminal, wherein the operation message is used to operate the STB.

Preferably, the gateway is configured to acquire, after receiving the message, authentication information from the operation message, and to send the message to the STB after successfully authenticating the terminal according to the authentication information.

Preferably, the gateway is further configured to record information about the message, between the STB and the terminal, forwarded by the gateway.

Preferably, the gateway forwards a message between the STB and the terminal using a session layer protocol.

Preferably, the gateway is applied to an IPTV system.

According to another aspect of the embodiment of the disclosure, an IPTV system is provided, including: an IPTV service management system, which is configured to acquire information about an online STB and to provide the information about the online STB to a terminal logging onto the IPTV service management system, wherein the information about the STB is used for the terminal to send a message to the STB.

According to another aspect of the embodiment of the disclosure, a message processing method is provided, including: a gateway receives a message sent from one of a terminal and an STB to the other one, wherein the gateway is connected with a network where the STB is located and connected with a network where the terminal is located, and can communicate with the STB and the terminal; the gateway forwards the message to the other one of the terminal and the STB.

Preferably, the message includes: an operation message sent by the terminal, wherein the operation message is used to operate the STB.

Preferably, before the gateway receives the message, the method further includes: an IPTV service management system receives information about an online STB; after the terminal logs onto the IPTV service management system, the IPTV service management system provides the information about the online STB to the terminal logging onto the IPTV service management system, wherein the information about the STB is used for the terminal to send a message to the STB.

Preferably, after the gateway forwards the message sent from the terminal to the STB, the method further includes: the STB acquires authentication information from the message and executes, after successfully authenticating the terminal according to the authentication information, an operation corresponding to the message; and/or, the gateway forwarding the message sent from the terminal to the STB includes: the gateway acquires authentication information from the message and sends the message to the STB after successfully authenticating the terminal according to the authentication information.

Preferably, the method further includes: the gateway records information about the message, between the STB and the terminal, forwarded by the gateway.

According to another aspect of the embodiment of the disclosure, a message processing device is provided, including: a receiving component, which is configured to receive a message sent from one of a terminal and an STB to the other one, wherein the gateway is connected with a network where the STB is located and connected with a network where the terminal is located, and can communicate with the STB and the terminal; a forwarding component, wherein the operation message is configured to forward the message to the other one of the terminal and the STB.

Preferably, the message includes: an operation message sent by the terminal, which is used to operate the STB.

Preferably, the device further includes: an authentication component, which is configured to acquire authentication information from the message and to call, after successfully authenticating the terminal according to the authentication information, the forwarding component to send the message to the STB.

Preferably, the device further includes: a recording component, which is configured to record information about the message, between the STB and the terminal, forwarded by the gateway.

Preferably, the device is located in the gateway.

According to another aspect of the embodiment of the disclosure, an STB is provided, which is connected with a gateway and is configured to receive a message forwarded by the gateway from a terminal and to execute an operation corresponding to the message.

Preferably, the STB is configured to acquire authentication information from the message sent from the terminal and to execute, after successfully authenticating the terminal according to the authentication information, an operation corresponding to the message.

Preferably, the STB is further configured to report, after getting online, an indication of online to an IPTV service management system.

In the embodiment of the disclosure, a gateway is added to an IPTV system, which is connected with a network where an STB is located and connected with a network where a terminal is located, and can communicate with the STB and the terminal to forward a message between the STB and the terminal. The embodiment of the disclosure solves the problem of being unable to interact with an STB if the matched remote control is lost or damaged, and achieves interaction with the STB through a terminal, thus providing a different mode of interaction with the STB, and improving user experience.

BRIEF DESCRIPTION OF THE DRAWINGS

For a better understanding of the embodiment of the disclosure, accompanying drawings described hereinafter are provided to constitute one part of the application; the schematic embodiments of the disclosure and the description thereof are used to illustrate the disclosure but to limit the disclosure improperly. In the accompanying drawings.

DETAILED DESCRIPTION OF THE EMBODIMENTS

It should be noted that the embodiments in the application and the characteristics of the embodiments may be combined if no conflict is caused. The disclosure is described below in detail by reference to the accompanying drawings in conjunction with embodiments.

In this embodiment, it is proposed to interact with an STB using a terminal, for example, functions such as control may be implemented through interaction. In this embodiment, the terminal implements interaction with the STB through a device on the network side. Generally, the terminal and the STB are located in different networks; this embodiment realizes the interaction between the terminal and the STB by adding a gateway proxy system.

In this embodiment, the terminal might be a mobile terminal (for example, mobile phone, tablet computer and the like), or might be other types of terminals. The operating system running on the terminal also might be various types of systems, for example, currently widely used Andrew system, or Windows operating system, iOS system and so on.

This embodiment provides a gateway, which may be applied to an IPTV system, may be connected with a network where an STB is located and a network where a terminal is located, can communicate with the STB and the terminal, and is configured to forward a message between the STB and the terminal.

The gateway, which is added to the IPTV system, may serve as a bridge to implement the message interaction between the STB and the terminal, thereby solving the communication problem between the terminal and the STB. There are multiple applications to solving this problem, for example, the terminal sends an operation message, which is used to operate the STB and through which the terminal may control the STB.

In this embodiment, the gateway might be a server, or a server group, or might be realized as a component to be set in an existing server or server group in an existing IPTV network architecture. For convenient description, the gateway might be considered as a system. In the following embodiments, the gateway may be a gateway proxy system.

A terminal may acquire information of an STB the terminal expects to control by multiple ways, for example, manually inputting the network identification of the STB on the terminal, so that the terminal may send information to the STB through the gateway proxy system. In a preferred implementation, the IPTV system also might include: an IPTV service management system, which may acquire information about an online STB and provides the information about the online STB to a terminal logging onto the IPTV service management system, and may send, after the terminal acquires the information about the STB, a message to the terminal according to the information about the STB. In this preferred embodiment, the STB may report to the service management system that the STB is online after the STB is powered on, without manually input information on the STB; thus, the terminal may acquire the information of the STB conveniently.

An example is provided below to illustrate the disclosure. For example, a terminal (for example, a smart terminal) first may log onto an IPTV system through an IPTV account and then display a list of programs after logging onto the IPTV system, also the smart terminal may display the information of online STBs and a user may select on the smart terminal an STB needing to be interacted. For another example, when a terminal (for example, a smart terminal) initiates a service operation, the terminal may display the name of an online STB directory on the screen and a user selects one STB to initiate a multi-screen service. The name of the STB displayed on the screen may be modified by the user.

To enhance the safety of the interaction between a terminal and an STB, safety authentication may be carried out. The authentication step may be performed by the STB or by a gateway proxy system, or by both of the STB and the gateway proxy system. For example, the STB may acquire authentication information from a received operation message, and execute the operation message after successfully authenticating the terminal according to the authentication information; and/or, the gateway proxy system may acquire, after receiving an operation message, authentication information from the received operation message, and send the operation message to the STB after successfully authenticating the terminal according to the authentication information. The address of the STB might be globally multiplexed; after a local STB is shut down, the address of the STB previously acquired by the smart terminal will be assigned to the STB of other users. Meanwhile, since the IPTV system supports that the STB introduces an authentication mechanism to the smart terminal, safety hazards caused by a malicious program controlling a listener port of the STB is prevented and corresponding safety is guaranteed.

In addition, In another preferred embodiment, the gateway proxy system might have some monitoring and alarm functions. For example, the gateway proxy system also might record information about the message, between the STB and the terminal, forwarded by the gateway proxy system. In an example, the gateway in the gateway proxy system may count the forwarding times between the terminal and the gateway proxy system and record the forwarding times into a log file. The recorded information may be used as monitoring information to monitor the terminal and the STB. In addition, relative information of operations performed by the gateway proxy system also may be recorded in the log information; when the gateway proxy system is down or dead, the gateway proxy system may be automatically started and recover the original information according to the information in the log file.

In a preferred embodiment, the gateway proxy system forwards a message between the STB and the terminal using a session layer protocol. For example, the message interaction between the gateway proxy system and the STB realizes a message transparent transmission using the socks5 protocol; the applied socks5 message protocol belongs to a session layer protocol, which may improve the direct interaction speed between the terminal and the STB. The terminal and the gateway proxy system may negotiate using a session layer protocol (for example, socks 5 protocol); after negotiation is completed, the gateway does not care the specific content of the following messages, but forwards the message to the specified address. Since the gateway does not care the actual content of the pushed message, the gateway may send the message to the STB accurately and quickly, thus the gateway may be well compatible with the existing IPTV service system. Points having a special demand on multi-screen services may be conveniently docked to the gateway proxy system.

In this embodiment, an STB is provided, which is connected with the above gateway to receive a message forwarded by the gateway from a terminal and to execute an operation corresponding to the message.

Preferably, the STB is configured to acquire authentication information from the message sent from the terminal and to execute, after successfully authenticating the terminal according to the authentication information, an operation corresponding to the message.

Preferably, the STB is further configured to report, after getting online, an indication of online to an IPTV service management system.

Figure 1:
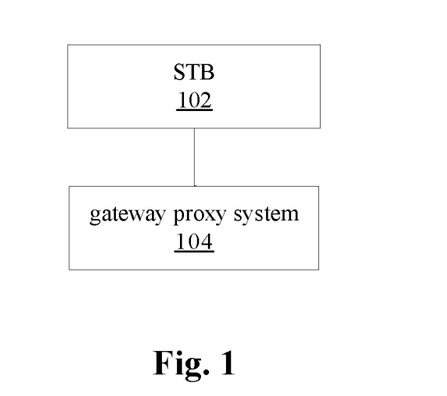
FIG. 1 is a structure diagram of an IPTV system according to an embodiment of the disclosure.

This embodiment also provides an IPTV system; FIG. 1 is a structure diagram of an IPTV system according to the embodiment of the disclosure; as shown in FIG. 1, the IPTV system might include a gateway proxy system 104 and an STB 102 described above. Preferably, the IPTV system might further include an IPTV service management system (not shown in FIG. 1). Or, the system might include a gateway proxy system and an IPTV service management system, and preferably might further include an STB. Which device or network element is divided into the IPTV system does not affect the solution to the technical problem.

Figure 2:
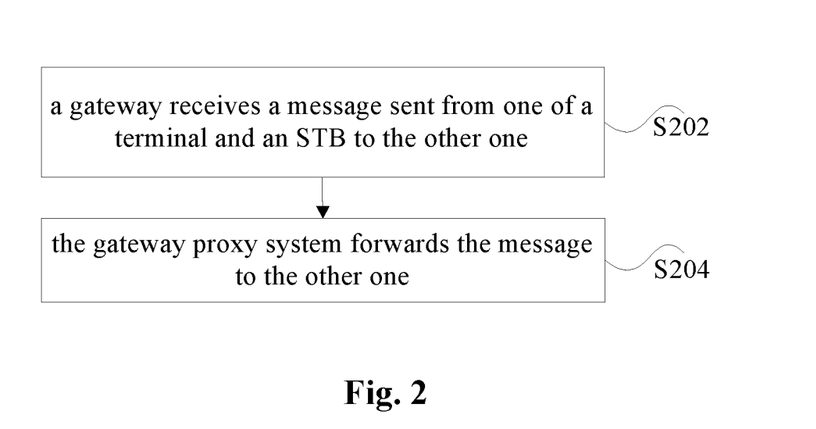
FIG. 2 is a flowchart of a message processing method according to an embodiment of the disclosure.

This embodiment also provides a message processing method. FIG. 2 is a flowchart of a message processing method according to an embodiment of the disclosure; as shown in FIG. 2, the method includes the following steps.

In step S202: a gateway receives a message sent from one of a terminal and an STB to the other one, wherein the gateway is connected with a network where the STB is located and connected with a network where the terminal is located, and may communicate with the STB and the terminal.

In step S204: the gateway proxy system forwards the message to the other one of the terminal and the STB. For example, the gateway proxy system forwards the message to the other one of the terminal and the STB using a session layer protocol.

In the above step, the gateway proxy system serves as a bridge to realize the interaction between the terminal (for example, smart terminal) and the STB, thereby providing the possibility for the implementation of multiple applications; for example, a user may remotely control the STB through the interface of the smart terminal, that is, the message includes: an operation message sent by the terminal, wherein the operation message is used to operate the STB.

Preferably, before step S202, the method further includes: the IPTV service management system acquire information about an online STB, and provides the information about the online STB to the terminal for the terminal to select.

Figure 3:
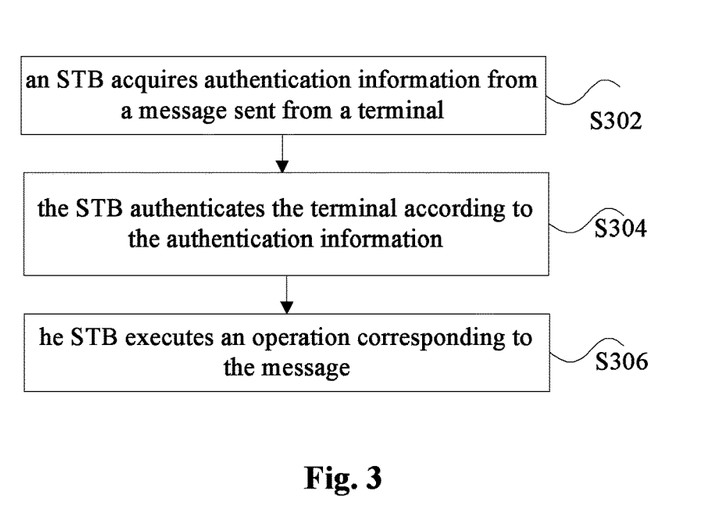
FIG. 3 is a processing flowchart of an STB in an IPTV system according to an embodiment of the disclosure.

FIG. 3 is a processing flowchart of an STB in an IPTV system according to an embodiment of the disclosure. FIG. 3 shows a preferred process; preferably, after a gateway proxy system forwards a message sent from a terminal to an STB, the STB performs the following steps.

In step S302: the STB acquires authentication information from the message sent from the terminal.

In step S304: the STB authenticates the terminal according to the authentication information and executes S306 in the case of successful authentication.

In step S306: the STB executes an operation corresponding to the message.

Through the preferred step, the STB authenticates the terminal. The authentication also may be performed by the gateway proxy system, which is shown in FIG. 4.

Figure 4:
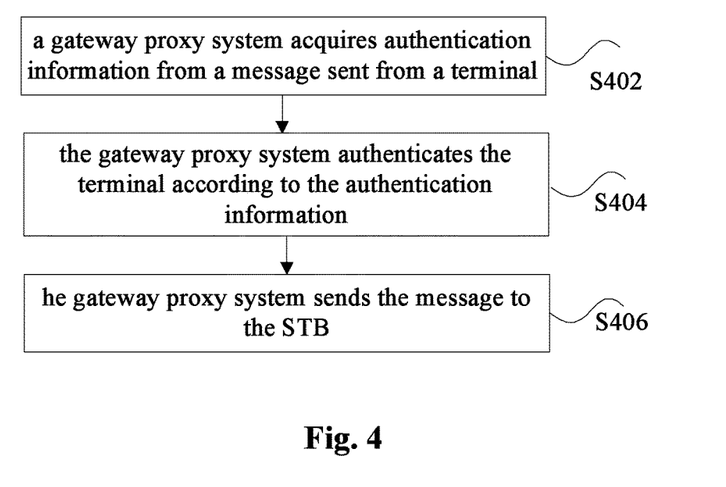
FIG. 4 is a flowchart of message forwarding according to an embodiment of the disclosure.

FIG. 4 is a flowchart of message forwarding according to an embodiment of the disclosure. As shown in FIG. 4, forwarding a message sent from a terminal to an STB includes the following steps.

In step S402: a gateway proxy system acquires authentication information from the message sent from the terminal.

In step S404: the gateway proxy system authenticates the terminal according to the authentication information and executes S506 in the case of successful authentication.

In step S406: the gateway proxy system sends the message to the STB.

Processes shown in FIG. 3 and FIG. 4 may be combined to implement.

It should be noted that steps shown in flowcharts in accompanying drawings might be executed, for example, in a computer system consisting of a group of computers capable of executing instructions. Moreover, although a logical order is given in the flowcharts, the steps shown or described might be executed in a different order in some cases.

Preferably, the gateway also may record information about the message, between the STB and the terminal, forwarded by the gateway.

It should be noted that steps shown in flowcharts in accompanying drawings might be executed, for example, in a computer system consisting of a group of computers capable of executing instructions. Moreover, although a logical order is given in the flowcharts, the steps shown or described might be executed in a different order in some cases.

Figure 5:
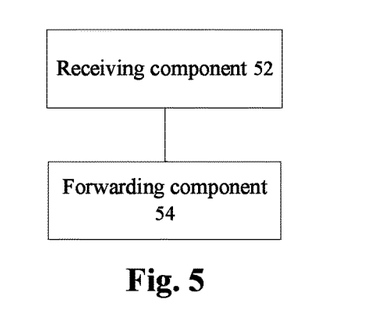
FIG. 5 is a structure diagram of a message processing device according to an embodiment of the disclosure.

This embodiment provides a message processing device, which is located in a gateway and corresponds to the above method to realize the function of the above gateway. Those described above are no longer described here. FIG. 5 is a structure diagram of a message processing device according to an embodiment of the disclosure; as shown in FIG. 5, the message processing device includes:

a receiving component 52 configured to receive a message sent from one of a terminal and an STB to the other one, wherein the gateway is connected with a network where the STB is located and connected with a network where the terminal is located, and may communicate with the STB and the terminal;

a forwarding component 54 configured to forward the message to the other one of the terminal and the STB.

Preferably, the device further includes an authentication component, which is configured to acquire authentication information from the message and to call, after successfully authenticating the terminal according to the authentication information, the forwarding component to send the message to the STB.

Preferably, the device further includes a recording component, which is configured to record information about the message, between the STB and the terminal, forwarded by the gateway.

It should be noted that the name of the components in the above embodiment cannot be understood as a limit to the components; for example, the forwarding component 54 also may be written as "a component configured to forward a message to the other one of the terminal and the STB"; the components also may be realized in one or more processors; therefore, the processor might include the above components, or the processor might realize the function of the components.

The disclosure is described below in conjunction with preferred embodiments.

Figure 6:
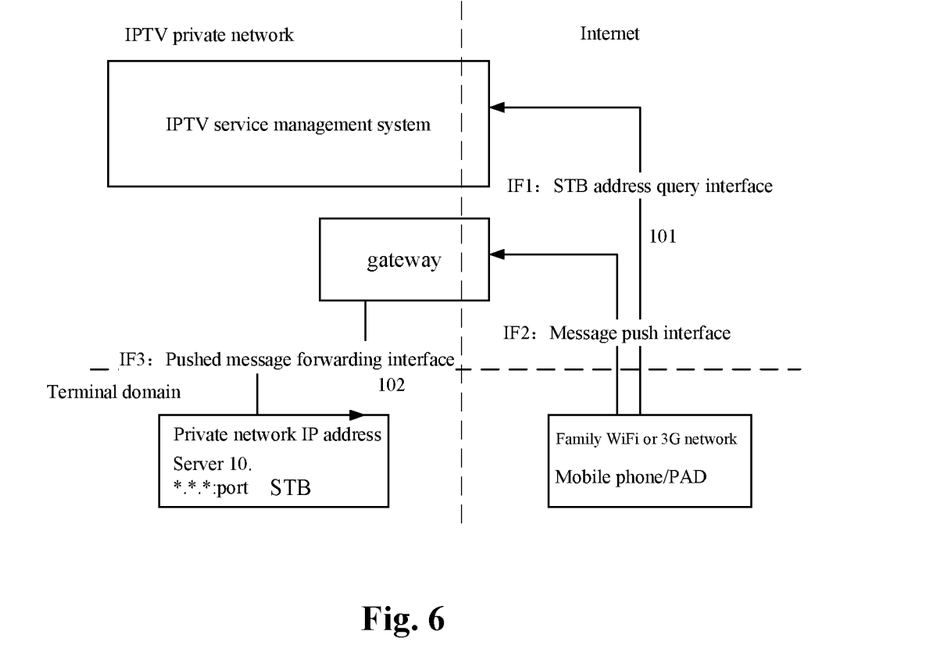
FIG. 6 is an interworking diagram of an IPTV system according to a preferred embodiment of the disclosure.

This preferred embodiment puts forwards a scheme of application scene. FIG. 6 is an interworking diagram of an IPTV system according to a preferred embodiment of the disclosure; as shown in FIG. 6, the location of a gateway proxy system involved in this embodiment of the disclosure just plays a function of bridge between the terminal (for example, smart terminal) and the STB in the system network.

Interface 602 and interface 604 involved in FIG. 6 are described below.

Interface 602, via which a mobile phone/Personal Assistant Device (PAD) may access the Internet through WiFi or 3G, to access an IPTV service management system and a gateway proxy system (to realize the function of the above gateway proxy system 104).

Interface 604: the gateway proxy system is a newly added device, which adopts a standard socks5 protocol and realizes necessary safety mechanisms and management functions. Through the interface 604, the gateway transparently transmits a message the smart terminal needs to send to the STB to a destination address (STB) specified by the terminal through the proxy protocol. The actual content of the pushed message does not be cared.

Figure 7:
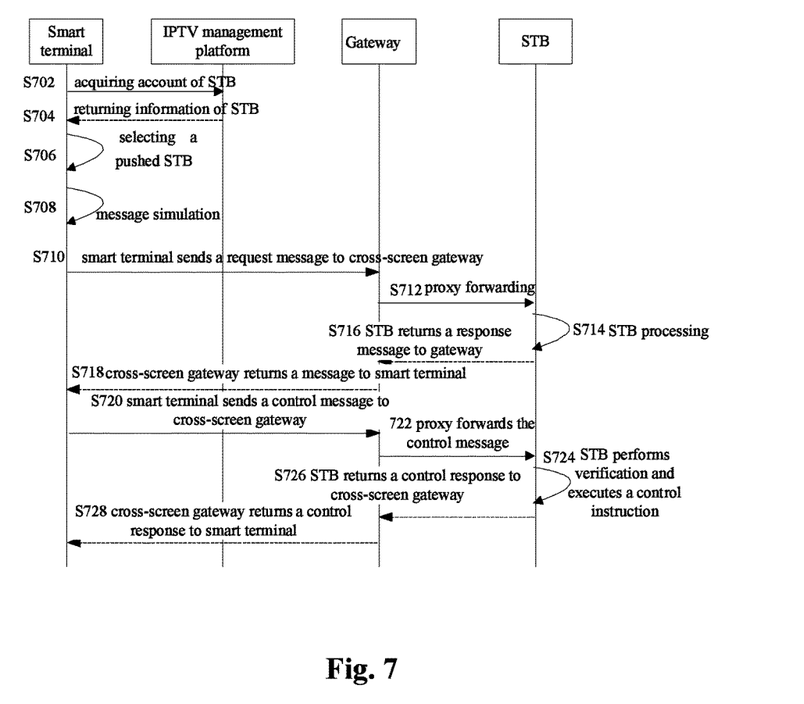
FIG. 7 is a flowchart of the interaction between a terminal and an STB according to a preferred embodiment of the disclosure.

FIG. 7 is a flowchart of the interaction between a terminal and an STB according to a preferred embodiment of the disclosure; this process illustrates the scene that the smart terminal interacts with the STB through a gateway proxy system. As shown in FIG. 7, the process includes the following steps.

In step S702: the account of the STB is acquired. For example, the smart terminal acquires a list of all online STBs in one family from an IPTV service management system through an IPTV account. For a new user, the STB must log onto the IPTV service management system before the smart terminal logs onto the STB.

In step S704: information of the STB is returned. For example, the IPTV service management system returns the IP address of the STB logging on with the above account, User token (Usertoken), Set-Top-Box Media Access Control (STBMAC) and other corresponding information.

In step S706: selecting a pushed STB. For example, when a mobile phone or pad and other smart terminals initiate a cross-screen operation, a destination STB to which the service is pushed is selected on a client first.

In step S708: message simulation. For example, the smart terminal builds a device description Uniform Resource Locator (URL) according to the acquired information about the STB and simulates a Universal Plug and Play (UPnP) notify message.

In step S710: the smart terminal sends a request message to the gateway. For example, the smart terminal sends a request to acquire UPnP device (service) description to the gateway proxy system.

In step S712: proxy forwarding. For example, the gateway performs authentication and forwards the request to the STB after successful authentication.

In step S714: STB processing. For example, the STB completes verification and processing according to UserToken.

In step S716: the STB returns a response message to the gateway. For example, the STB returns the verification result and the UPnP device description information to the gateway.

In step S718: the gateway returns the message to the smart terminal. For example, the gateway returns the UPnP device description information to the smart terminal.

In step S720: the smart terminal sends a control message to the gateway. For example, according to the returned UPnP description information, the smart terminal sends an UPnP control message supported by the STB (the message carrying Usertoken information).

In step S722: the proxy forwards the control message. For example, the gateway proxy forwards the control message to the STB.

In step S724: the STB performs verification and executes a control instruction. For example, after receiving the message, the STB compares the message with the saved Usertoken to perform verification and executes the control instruction after passing the verification.

In step S726: the STB returns a control response to the gateway. For example, the STB returns a control response to the gateway.

In step S728: the gateway returns the control response to the smart terminal. For example, the gateway returns an UPnP control response to the smart terminal.

Figure 8:
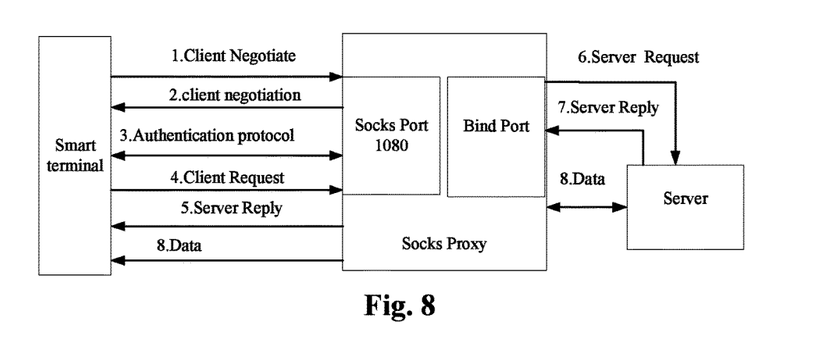
FIG. 8 is diagram of a socks5 forwarding connection according to a preferred embodiment of the disclosure.

FIG. 8 is diagram of a socks5 forwarding connection according to a preferred embodiment of the disclosure. As shown in FIG. 8, a smart terminal and a gateway negotiate using the SOCKS5 protocol (if user/password method is applied, the user name and the password are configured by system and are manually agreed by a client and a server side); it is needed to support Internet Protocol Version 4 (IPV4) and Internet Protocol Version 6 (IPV6), the Internet Protocol (IP), which is for interconnection between requested destination networks, and the destination port are specified for the gateway, and a Transfer Control Protocol (TCP) link is created. After negotiation, the gateway does not care the specific content of the following messages but forwards the message to the specified address. The gateway performs time-out detection on the TCP link; if no process is done when time-out occurs, the link will actively break. The client subsequently needs to renegotiate and re-establish a link.

Through the above preferred embodiments, in view of a specific networking model in an IPTV three-screen system, the point to point communication between a smart terminal and an STB is realized in the condition that network communication cannot be implemented between the network plane on which the smart terminal (mobile phone/PAD and so on) is located (called plane A) and the network plane on which the STB is located (called plane B); thus, a user may push a program to an STB to play while browsing a program list through a mobile phone/PAD, and may change frequency, control voice volume, move focus and perform other remote control operations on the STB. This type of embodiments enriches the application models of multi-screen services in an IPTV system, and the disclosure provides a corresponding solution to the application model.

Through the above embodiments and preferred implementations, a smart terminal and an STB may perform effective message interaction, thereby improving the interaction capability among multiple screens, enriching the application scenes and models of multi-screen operations. For example, a smart terminal may remotely control an STB, may browse a page and request a program, thereby realizing the play of program on the STB. Then, when the smart terminal logs onto an IPTV service management system using the same account, the terminal may provide real-time sharing of favourite, bookmark and subscription, thereby providing convenience for users.

Obviously, those skilled in the art should understand that the components or steps described above may be implemented by a common computer device; the components or steps may be integrated on a single computing device or distributed on a network composed of a plurality of computing devices; optionally, the components or steps may be implemented by a programming code executable by a computing device, thus they may be stored in a storage device to be executed by a computing device, or manufactured into individual integrated circuit component respectively, or several of them may be manufactured into a single integrated circuit component to implement; in this way, the disclosure is not limited to any combination of specific hardware and software The above are only the preferred embodiments of the disclosure and not intended to limit the disclosure. For those skilled in the art, various modifications and changes may be made to the disclosure. Any modification, equivalent substitute and improvement made within the spirit and principle of the disclosure are intended to fall into the scope of protection of the disclosure.

INDUSTRIAL APPLICABILITY

The technical scheme provided by the embodiment of the disclosure is applicable to communication fields, solves the problem of being unable to interact with an STB if the matched remote control is lost or damaged, and achieves interaction with the STB through a terminal, thus providing a different mode of interaction with the STB, and improving user experience.

What is claimed is:

1. A gateway, which is connected with a network where a Set-Top Box (STB) is located and connected with a network where a terminal is located, wherein the gateway comprises a hardware processor configured to execute program modules stored on a memory, the program modules are configured to communicate with the STB and the terminal, and are configured to forward a message between the STB and the terminal;

wherein the message comprises an operation message sent by the terminal, wherein the operation message is used to operate the STB;

wherein the gateway is configured to acquire, after receiving the message, authentication information from the operation message, and to send the message to the STB after successfully authenticating the terminal according to the authentication information;

wherein the gateway receives a request from the terminal to acquire UPnP device description before successfully authenticating the terminal according to the authentication information; the gateway performs authentication and forwards the request to the STB after successful authentication; and the gateway receives a response message from the STB, which carries the UPnP device description.

2. The gateway according to claim 1, wherein the gateway is further configured to record information about the message, between the STB and the terminal, forwarded by the gateway.

3. The gateway according to claim 1, wherein the gateway forwards the message between the STB and the terminal using a session layer protocol.

4. The gateway according to claim 1, wherein the gateway is applied to an Internet Protocol Television (IPTV) system.

5. A message processing method, comprising:

receiving, by a gateway, a message sent from one of a terminal and a Set-Top Box (STB) to the other one, wherein the gateway is connected with a network where the STB is located and connected with a network where the terminal is located, and can communicate with the STB and the terminal;

forwarding, by the gateway, the message to the other one; wherein the message comprises an operation message sent by the terminal, wherein the operation message is used to operate the STB;

wherein after the gateway forwards the message sent from the terminal to the STB, the method further comprises: the STB acquiring authentication information from the message and executing, after successfully authenticating the terminal according to the authentication information, an operation corresponding to the message; and/or, the gateway forwarding the message from the terminal to the STB comprises: the gateway acquiring authentication information from the message and sending the message to the STB after successfully authenticating the terminal according to the authentication information;

wherein the gateway receives a request from the terminal to acquire UPnP device description before successfully authenticating the terminal according to the authentication information; the gateway performs authentication and forwards the request to the STB after successful authentication; and the gateway receives a response message from the STB, which carries the UPnP device description.

6. The method according to claim 5, further comprising: recording, by the gateway, information about the message, between the STB and the terminal, forwarded by the gateway.

7. The method according to claim 5, wherein the gateway forwards the message to the other one of the STB and the terminal using a session layer protocol.

8. A message processing device, wherein the device comprises a hardware processor configured to execute program components stored on a memory, and the program components comprise:

a receiving component connected to a forwarding component and configured to receive a message sent from one of a terminal and a Set-Top Box (STB) to the other one, wherein the gateway is connected with a network where the STB is located and connected with a network where the terminal is located, and can communicate with the STB and the terminal;
the forwarding component configured to forward the message to the other one;
wherein the message comprises: an operation message sent by the terminal, wherein the operation message is used to operate the STB;
wherein the device further comprises:
an authentication component configured to acquire authentication information from the message and to call, after successfully authenticating the terminal according to the authentication information, the forwarding component to send the message to the STB; and/or
a recording component, configured to record information about the message, between the STB and the terminal, forwarded by the gateway;
wherein the device is configured to receive a request from the terminal to acquire UPnP device description before successfully authenticating the terminal according to the authentication information; perform authentication and forward the request to the STB after successful authentication; and receive a response message from the STB, which carries the UPnP device description;
wherein the device is located in the gateway.

\* \* \* \* \*